United States Patent Office 3,560,575
Patented Feb. 2, 1971

3,560,575
PREPARATION OF NITROALCOHOL
John B. Tindall, Terre Haute, Ind., assignor to Commercial Solvents Corporation, a corporation of Maryland
No Drawing. Filed Sept. 7, 1966, Ser. No. 577,592
Int. Cl. C07c 71/10, 79/18, 91/06
U.S. Cl. 260—635                                4 Claims

ABSTRACT OF THE DISCLOSURE

Nitroalcohols are produced by reacting a nitroparaffin with a stoichiometric excess of formaldehyde, said excess being from about 5 to 60% equivalents, deionizing the reaction product thereof to remove the metal ion of said catalyst, fractionating said deionized reaction product with methanol in the presence of a mineral acid, toluene sulfonic acid or cation exchange resin in an amount sufficient to catalyze the reaction of the excess of the formaldehyde and methanol, the methanol being used in an amount sufficient to react with the aldehyde remaining in said fractionated product, and removing the reaction product of said formaldehyde and methanol from the resulting mixture.

---

This invention relates to the production of hydroxyalkyl nitroparaffins and hydroxyalkyl aminoparaffins by the reaction of a nitroparaffin and formaldehyde. More specifically, this invention relates to an improvement in the process for producing such compounds whereby products of improved color stability are obtained.

It has been known for many years that nitroparaffins, e.g. of 1 to 6 or 8 carbon atoms, which have an active hydrogen atom and aliphatic aldehydes can be reacted in the presence of alkaline catalysts to produce nitro-alcohols and -glycols. According to this process, one molecule of aldehyde may be added to the nitroparaffin at each hydrogen atom attached to the carbon atom to which the nitro group is attached. Thus, it is possible to produce a trihydroxy compound from nitro-methane. Heretofore, for the production of tris (hydroxymethyl) nitro-methane, for example, this reaction has been carried out by mixing nitromethane and formaldehyde in essentially equimolecular amounts in a solution containing the alkaline catalyst, and allowing the exothermic reaction to raise the temperature, with additional heating of the mixture to secure an increased temperature, if desired. This procedure has given rise to the formation of the desired products; however, it has been found that the tris (hydroxymethyl) nitromethane produced according to this standard method using equimolecular amounts develops considerable color in the course of time, e.g. one or two years. Although products prepared with an excess of formaldehyde develop less color and those made with an excess nitromethane develop more color, in either event, the color of the final product deteriorates and, with aging, high colors are developed. These high colored or dark colored products are undesirable.

A process has now been discovered whereby tris (hydroxymethyl) nitromethane having good color stability on storage and high purity as determined by reduction to the corresponding amino compound is produced. In general, this improved process comprises reacting nitromethane with a large excess of formaldehyde in the presence of an alkaline catalyst such as sodium hydroxide and thereafter removing the sodium ion present as a residue from the alkaline catalyst and distilling or fractionating the reaction product with methanol in the presence of sulfuric acid or a cation exchange resin to remove the excess formaldehyde as methylal which is low boiling and can be fractionated out of the mixture.

In general, this process is applicable for improving the color stability of nitroalcohols or nitroglycols of the formula $(R)_3$—C—$NO_2$ where R is lower hydroxyalkyl or lower alkyl, e.g. of about 1 to 8 carbon atoms. Such nitroalcohols are produced from nitroparaffins having at least one active, and up to three, hydrogen atoms on the carbon atoms to which the nitro group is attached. Since an excess of aldehyde is required, compounds where R is hydrogen are not contemplated. The formaldehyde which is used in the instant process can be a formaldehyde releasing substance as known in the art as paraformaldehyde. Commercially available formaldehyde solutions, e.g. 37% aqueous solution of formaldehyde known as formalin, can be used also. In general, formaldehyde is present in the reaction mixture in a large molecular excess, generally of from about 5 to 60% equivalents, preferably 10 to 30%, excess referred to the nitroparaffin. The present invention is applicable to the production of 2-nitro-2-methyl-1-propanol, 2-nitro-2-methyl-1, 3-propanediol, 2-nitro-2-ethyl-1, 3-propanediol, 2-nitro-2-ethyl-1-butanol, etc., for example.

Any suitable alkaline catalyst can be employed in this process as, for example, sodium hydroxide, potassium hydroxide, potassium carbonate, or any of the alkaline catalysts previously employed for this type of condensation reaction. In general, a concentration of from about 0.1% to about 1% by weight of catalyst based on the total weight of the reaction mixture will be satisfactory.

The nitromethane and formaldehyde are reacted in a fluid mixture in the presence of the catalyst at a temperature sufficient to produce the desired reaction, e.g. from about 20° to 100° C., preferably from 25 to 50° C., and for a period of time sufficient to react essentially all of the nitromethane. Since the reaction is exothermic, additional heating may not be required to attain the desired temperature. Times sufficient for this reaction vary with the reactants and temperature from several minutes to several hours. In general, times from about 15 minutes to 10 hours, particularly 0.5 to 3 hours, are sufficient.

Following reaction of the formaldehyde and nitromethane, the reaction product is treated to remove the sodium ion, or other metal ion remaining from the catalyst, for example, with an ion exchange material which can be a relatively high molecular weight, water insoluble, solid resin or carbonaceous material containing an acidic functional group, for example, —$CO_2H$ or —$SO_3H$ or a plurality of such groups. These materials are exemplified by the sulfonated coals (SEO–KARB H, Nalcite X, and Nalcite AX) produced by the treatment of bituminous coals with sulfuric acids and commercially marketed as zeolitic water softeners or base exchangers. Sulfonated resin-type materials include the reaction products of phenol-formaldehyde resins with sulfuric acid (Amberlite IR–1, Amberlite IR–100, Amberlite IR–120, and Nalcite MX). The reaction product of the nitromethane and formaldehyde is passed through the ion exchange resin, e.g. through a column containing the resin, in fluid form and the sodium ion is removed. The ion exchange resin can be regenerated by treatment with a dilute mineral acid and reused.

After removal of the sodium ion, the reaction product is distilled with methanol in an amount sufficient to react with the formaldehyde remaining in the product and form methylal. This distillation is carried out in the presence of a sufficient amount of either sulfuric acid or a cation exchange resin such as described above to catalyze the reaction of formaldehyde with methanol. Other suitable acids are mineral acids, i.e. phosphoric and hydrochloric acid, toluene sulfonic acid, etc., and the acid is generally added in an amount sufficient to render the reaction mixture acidic, preferably to a pH of about 1 to 4. The amount of methanol required to react with the formaldehyde can be determined from the excess of formaldehyde used and is preferably in excess of the stoichiometrically required amount for the reaction of methanol and formaldehyde to produce methylal. In general, methanol is used in amounts of from about 210 to 1000% by weight, preferably 300 to 600% based on the free formaldehyde. From about 0.01 to 1% by weight, preferably about 0.1 to 0.5% of acid, e.g. sulfuric acid is present in the reaction product during distillation, or, alternatively, from about 0.5 to 10%, preferably about 1 to 5% by weight, of a cation resin, e.g. Amberlite IR–120. Since the methylal formed is low boiling, it can be readily removed from the reaction product by fractionation. The product prepared by this method is especially suitable for spray drying.

The following Examples I through X serve to illustrate the invention without, however, limiting the same.

EXAMPLES I–X

Tris (hydroxymethyl) nitromethane (TN) was made according to these examples by adding nitromethane (NM) to formaldehyde (HCHO) and NaOH catalyst at 35° C., and holding for one hour at 35° C. The nitromethane analyzed 95.5% nitromethane, 1.6% nitroethane, 2.8% 2-nitropropane and 0.04% 1-nitropropane and stoichiometry was based upon this analysis. The reaction mixture was then deionized to remove sodium ion.

Variations in the method of preparing the TN compounds in Examples I–X, and in the ratio of nitromethane to formaldehyde, were as follows:

Example I—Equivalent nitromethane. No additional treating.

Example II—Equivalent nitromethane. No additional treating.

Example III—3% excess formaldehyde. No additional treating.

Example IV—3% excess nitromethane. No additional treating.

Example V—Equivalent nitromethane. The reaction mixture was passed through an ion exchange column containing Amberlite IR–120 resin to remove the sodium ion. Effluent from the ion-exchange column was evaporated to near dryness at 15 mm. from an 80° C. bath, and then made up to original concentration with water and methanol.

Example VI—28% excess formaldehyde. After deionization as described in Example V, the reaction mixture was distilled through a 48 inch column with 0.2% sulfuric acid and 37% of its weight of methanol until the formaldehyde had been removed as methylal. About six hours distillation time was required.

Example VII—28% excess formaldehyde. After deionization as described in Example V, the effluent from the ion exchange column was distilled through a column with 40% of its weight of methanol and 3% of its weight of IR–120 resin until the formaldehyde was distilled off as methylal, about 7.5 hours.

Example VIII—Same as Example VII using 99.8% nitromethane.

Example IX—12% excess formaldehyde and treatment as in Example VII.

Example X—14% excess formaldehyde. The effluent was fractionated with 10% of its weight of methanol and 1% of its weight of Amberlite IR–120 until free from methylal and most of the methanol, to 70° C. vapor temperature at top of column, about six hours.

The TN was analyzed and samples were held for storage. The TN was reduced to TA and the filtrates and concentrates were analyzed. The concentrates were evaporated to dryness and a portion converted to estide (reaction product of a fatty acid with an aminohydroxy compound and formaldehyde) to determine the color of the product.

The effect of the variations in the preparation of tris (hydroxymethyl) nitromethane (TN) upon the TN product and tris (hydroxymethyl) aminomethane (TA) prepared therefrom is shown by the results summarized in Table I.

TABLE I.—PREPARATION AND REDUCTION OF TN

| Example | 1 | 2 | 3 | 4 | 5 | 6 | 7 | 8 | 9 | 10 |
|---|---|---|---|---|---|---|---|---|---|---|
| TN product: | | | | | | | | | | |
| HCHO (percent) | 0.406 | 0.394 | 0.848 | 0.250 | 0.307 | 0.078 | 0.075 | 0.085 | 0.180 | 0.143 |
| NM (percent) | 0.139 | 0.120 | 0.0035 | 0.402 | 0.0001 | 0.0006 | 0.00009 | Nil | 0.0003 | 0.06 |
| pH | 3.5 | 3.5 | 3.5 | 3.5 | 3.5 | | 2.75 | 2.81 | 2.88 | 2.86 |
| Transmittance T 420 (percent) | 97.5 | 96.0 | 96.3 | 97.2 | 97.0 | 97.2 | 93.0 | 95.0 | 98.2 | 87.3 |
| APHA color | 20 | 45 | 20 | 45 | 50 | 20 | 50 | 20 | 15 | |
| TN storage time (days) | 882 | 881 | 877 | 876 | 869 | 804 | 795 | 789 | 784 | 460 |
| Transmittance after storage T 420 (percent) | 32.2 | 23.2 | 66.2 | 2.8 | 30.1 | 95.1 | 92.9 | 95.4 | 94.3 | 86.2 |
| APHA color after storage | | | | | | 40 | 50 | 30 | 20 | |
| Gardner color after storage | 6 | 6 | 3 | 10 | 6 | | | | | 1 |
| Temperature of reduction (° C.) | 75 | 35 | 35 | 35 | 35 | 35 | 35 | 35 | 35 | 75 |
| TA filtrate KMNO₄, time (min.) | 60+ | 60+ | 60+ | 60+ | 60+ | | | | | |
| TA filtrate, T 420 (percent) | 99.8 | 99.5 | 95.8 | 98.2 | 98.5 | | | | | |
| TA filtrate, APHA color | 5 | 5 | 5 | 5 | 5 | | | | | |
| TA concentrate: | | | | | | | | | | |
| TA concentrate, T 420 (percent) | 95.0 | 92.0 | 90.0 | 94.0 | 89.0 | | | | | |
| TA concentrate, APHA color | 25 | 50 | 30 | 40 | 40 | | | | | |
| TA concentrate, impurity ratio | 0.10 | 0.07 | 0.09 | 0.07 | 0.07 | ¹ 0.03 | ¹ 0.03 | ¹ 0.03 | ¹ 0.06 | 0.10 |
| TA residue, estide oil color—Gardner | 12–13 | 11 | 10–11 | 11–12 | 11 | 7–8 | 7–8 | 8 | 8 | |

¹ Rocking bomb runs, rest 5-gallon autoclave.

What is claimed is:

1. In the production of nitroalcohols by reaction of a nitroparaffin having from 1 to 8 carbon atoms and at least one hydrogen on the carbon atom to which the nitro group is attached and formaldehyde in the presence of an alkaline catalyst, the improvement of a process for the production of nitroalcohols having improved color stability which comprises reacting said nitroparaffin at a temperature from about 20 to 100° C. with a stoichiometric excess of said formaldehyde, said excess being from about 5 to 60% equivalents, deionizing the reaction product thereof to remove the metal ion of said catalyst, fractionating said deionized reaction product with methanol in the presence of a cation exchange resin in an amount sufficient to catalyze the reaction of the excess of said formaldehyde and methanol, said methanol being used in an amount sufficient to react with the aldehyde remaining in said fractionated product, and removing the reaction product of said formaldehyde and methanol from the resulting mixture.

2. The improvement of claim 1 wherein said cation exchange resin is present in an amount of from about 0.5 to 10% by weight based upon the reaction mixture.

3. In the production of nitroalcohols by reaction of a nitroparaffin having from 1 to 8 carbon atoms and at least one hydrogen on the carbon atom to which the nitro group is attached and formaldehyde in the presence of an alkaline catalyst, the improvement of a process for the production of nitroalcohols having improved color stability which comprises reacting said nitroparaffin at a temperature from about 20 to 100° C. with a stoichiometric excess of formaldehyde, said excess being from about 5 to 60% equivalents, deionizing the reaction product thereof to remove the metal ion of said catalyst, fractionating said deionized reaction product with methanol in the presence of from about 0.5 to 10 percent by weight based upon the reaction mixture of cation exchange resins in an amount sufficient to catalyze the reaction of the excess of said formaldehyde and methanol, said methanol being used in an amount from about 210 to 1000% by weight based upon the stoichiometrically required amount to react with the excess aldehyde used in the reaction, and removing the reaction product of said formaldehyde and methanol from the resulting mixture.

4. The improvement of claim 3 wherein said resin is present in an amount of from about 1 to 5% by weight based upon the reaction mixture.

References Cited

UNITED STATES PATENTS

| | | | |
|---|---|---|---|
| 2,231,403 | 2/1941 | Wyler | 260—635N |
| 2,301,259 | 11/1942 | Cox | 260—638N |
| 2,629,746 | 2/1953 | Cox | 260—637P |
| 3,232,998 | 2/1966 | Neal | 260—643 |
| 3,301,825 | 1/1967 | Hostettler et al. | 260—635N |

OTHER REFERENCES

Vanderbilt et al., "Ind. and Eng. Chem.," vol. 32 (1940), pp. 34–38.

Walker, "Formaldehyde," (1944), p. 29.

LEON ZITVER, Primary Examiner

J. E. EVANS, Assistant Examiner

U.S. Cl. X.R.

260—584, 637, 638, 643